(No Model.)
A. RYAN.
TIRE.
No. 605,917. Patented June 21, 1898.
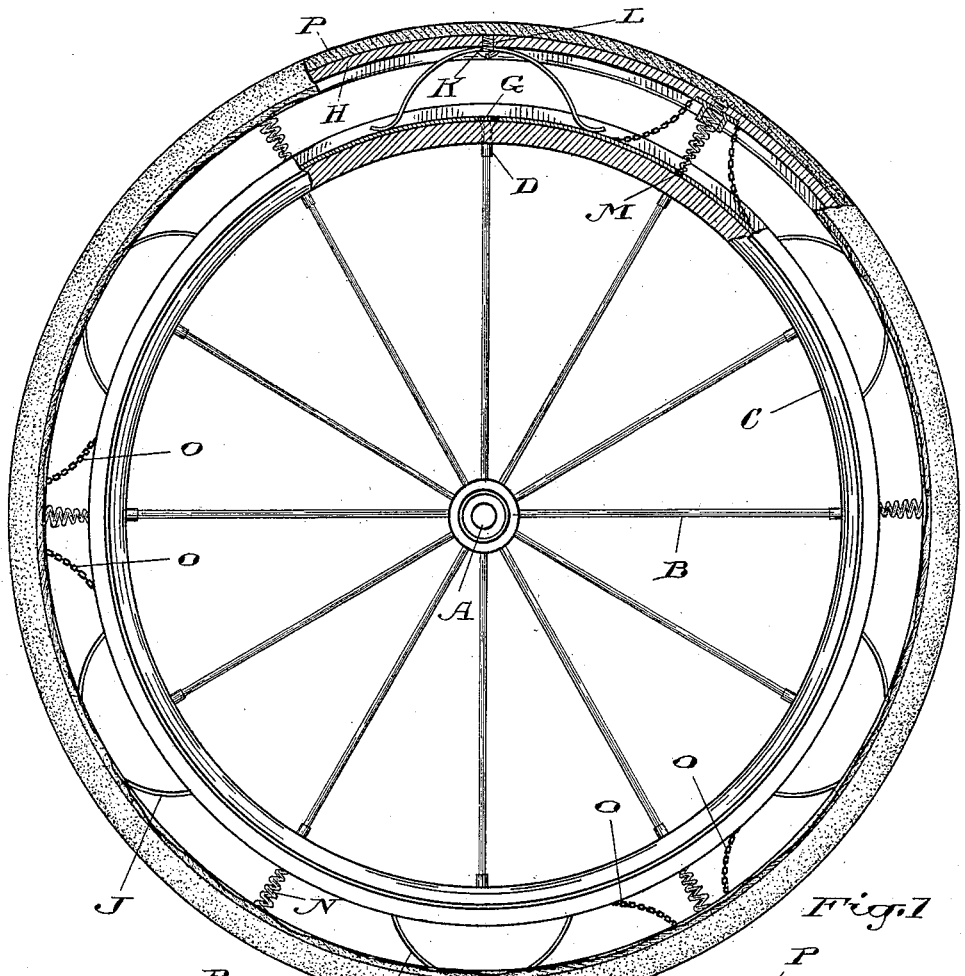
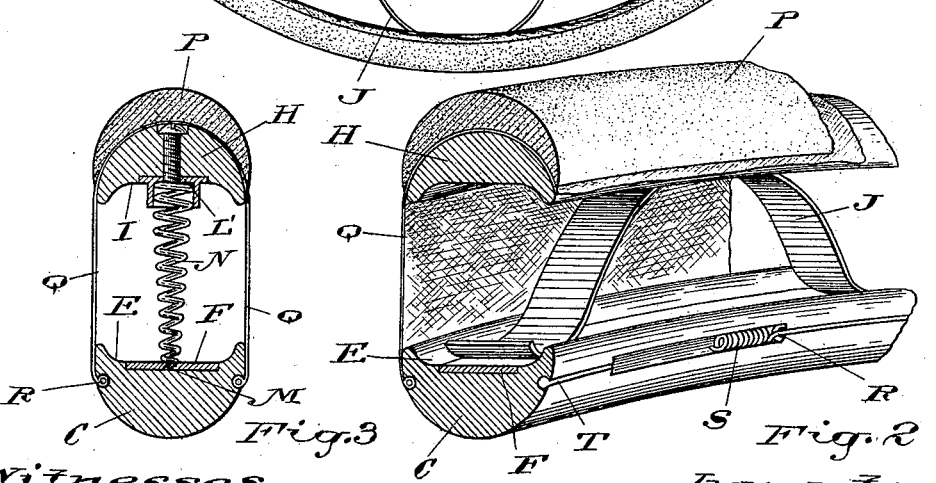
Witnesses
J. E. Cameron
J. F. Riggs
Inventor
Austin Ryan
by C. H. Riches
his attorney.
THE NORRIS PETERS CO., PHOTO-LITHO., WASHINGTON, D. C.

UNITED STATES PATENT OFFICE.

AUSTIN RYAN, OF PRESTON, CANADA.

TIRE.

SPECIFICATION forming part of Letters Patent No. 605,917, dated June 21, 1898.

Application filed January 3, 1898. Serial No. 665,307. (No model.)

*To all whom it may concern:*

Be it known that I, AUSTIN RYAN, of Preston, in the county of Waterloo and Province of Ontario, Canada, have invented certain new and useful Improvements in Tires; and I hereby declare that the following is a full, clear, and exact description of the same.

This invention relates to certain new and useful improvements in tires for all classes of vehicle-wheels—such as velocipedes, motocycles, sulkies, carriages, &c.—in which flexibility, elasticity, and resiliency are required to be combined with the more important requisites of strength and durability. Experience has repeatedly proven that a vehicle fitted with flexible elastic resilient tires requires less power to insure its propulsion than one fitted with solid or inflexible tires. The pneumatic tire has hitherto been the only tire having these properties and has been extensively used on bicycles and other foot-propelled vehicles and has found a limited use on motocycles and "light horse-vehicles." To provide a wheel which has all the properties and advantages of the pneumatic tire, so far as lightness, flexibility, elasticity, and resiliency are concerned, and the same strength and durability of the solid tire, is the object of the present invention; and the invention consists of the device hereinafter set forth, and more particularly pointed out in the claim.

In the drawings, Figure 1 represents a side elevation of a wheel, showing the tire attached. Fig. 2 represents a perspective view of one of the springs and a section of the rim. Fig. 3 represents a sectional view of a part of the wheel.

Like letters of reference refer to like parts throughout the specification and drawings.

A represents the hub of the wheel, B the spokes, C the rim, and D the spoke-nipples, all of these parts being made in substantially the same manner as if they were intended for use in the manufacture of an ordinary bicycle-wheel.

The perimeter of the rim C is provided with a concaved circumferential channel E, located medially between the sides of the rim. In the bottom of the channel E is a band F, preferably of hardened steel or other anti-friction metal. This band F, if desired, may be set in a countersunk seat or recess, so that its top face will be in the same plane as the bottom of the channel E.

Drilled through the band F and rim C are a series of holes G for the spoke-nipples D, which permit of the spokes being removed or replaced without interfering with these parts.

H represents a supplemental rim of a greater diameter than that of the rim D and which it encircles when the parts are assembled. The inner face of the rim H is provided with a concaved annular channel I, corresponding to the channel E.

J J represent a series of springs, each consisting of a substantially U-shaped piece of spring-steel having a hole K drilled through its center for the fastening bolt or screw and its ends curled or rounded. Each spring J is secured in position by placing its bellied or rounded part in the channel I and passing a bolt or screw L through the hole K into the rim H. When the supplemental rim H, with its attached springs J J, and the wheel are assembled, the curled or rounded ends bear upon the band F, or if the band F is not used they bear upon the bottom of the channel E.

Drilled through the band F are a series of holes M M, located one opposite each of the bolts L. Each of the bolts L projects inward from the under side of its respective spring J and acts as a stud L', in the manner hereinafter set forth.

N N represent a series of helical springs corresponding in number and location with the flat springs J. The top or upper end of each spring N embraces its respective stud L', while its lower end is inserted into its respective hole M in the band F, which, with the rim C, forms a socket to retain it in position, the purpose of these springs being to prevent the lateral displacement of the rim H. To prevent the rim H creeping on the rim C during the progress of the wheel, there are attached to these rims at equidistant points four or more chains O of sufficient slackness to allow of all legitimate movements of the several parts, but sufficiently taut to prevent the rim H creeping on the rim C.

Cemented or otherwise fastened to the tread of the rim H is a shoe P, of rubber or other flexible resilient material, and depending from each side of the shoe P is a curtain Q, of the same material. The edge of each curtain Q is fitted with a wire R, and uniting the ends of each wire R is a spring S, which allows of the wires being sprung into position in the grooves T, cut in the rim C to receive them.

While I have shown and described the invention as applied to a bicycle-wheel, I do not wish to have it confined to that particular class of wheels, as it may be used with but slight modifications on all classes of vehicle-wheels.

Having thus fully described my invention, what I claim as new, and desire to secure by Letters Patent, is—

A wheel embracing in its construction an inflexible wheel-rim, having its perimeter channeled circumferentially, a ribbon of antifriction metal located in the channel, a supplemental rim concentric with the wheel-rim having an annular channel in its inner face corresponding to the channel in the perimeter of the wheel-rim, a plurality of undulated ribbon-springs interposed between the rims, each having its bellied portion fastened in the groove of the supplemental rim and its ends freely resting on the antifriction metal in the groove of the wheel-rim, a series of helical springs interposed between the rims, each held in position by a stud projecting inwardly from the under side of the adjacent undulated spring holding its outer end, and a socket in the antifriction-ribbon holding its inner end, a plurality of chains connected to the wheel-rim and supplemental rim, to prevent the supplemental rim creeping on the wheel-rim, a flexible shoe secured to the perimeter of the supplemental rim, and a curtain depending from each side of the shoe, covering the opening between the concentric rims, the inner edge of which is fitted with a wire sprung into grooves cut in the inner face of the wheel-rim, the ends of each wire connected by springs, substantially as specified.

Toronto, December 24, A. D. 1897.

AUSTIN RYAN.

In presence of—
J. E. CAMERON,
C. H. RICHES.